United States Patent [19]

Hlavinka et al.

[11] Patent Number: 5,345,070
[45] Date of Patent: Sep. 6, 1994

[54] RADIO FREQUENCY TUBING SEALER

[75] Inventors: Dennis J. Hlavinka, Golden; Frank Corbin, III, Littleton; Robert L. White, Kittridge, all of Colo.

[73] Assignee: COBE Laboratories, Inc., Lakewood, Colo.

[21] Appl. No.: 21,507

[22] Filed: Feb. 23, 1993

Related U.S. Application Data

[63] Continuation-in-part of Ser. No. 952,951, Sep. 25, 1992, abandoned.

[51] Int. Cl.⁵ .............................................. H05B 6/62
[52] U.S. Cl. ................................. 219/769; 219/777; 156/273.7; 156/380.3
[58] Field of Search ............... 219/10.53, 10.81, 10.67, 219/10.73, 10.75, 765, 769, 777; 156/272.2, 273.7, 274.4, 274.6, 275.1, 380.6, 380.7, 380.3, 380.4, 380.5, 380.2, 380.8

[56] References Cited

U.S. PATENT DOCUMENTS

| | | |
|---|---|---|
| 2,638,963 | 5/1953 | Frederick et al. . |
| 2,667,437 | 1/1954 | Zoubek . |
| 2,816,596 | 12/1957 | Welch, Jr. .................. 219/10.53 |
| 2,941,575 | 6/1960 | Malmberg et al. . |
| 3,126,307 | 3/1964 | Drittenbass . |
| 4,013,860 | 3/1977 | Hosterman et al. . |
| 4,059,478 | 11/1977 | Hoffman . |
| 4,135,957 | 1/1979 | Voller . |
| 4,186,292 | 1/1980 | Acker . |
| 4,210,479 | 7/1980 | Fabisiewicz ................. 219/10.81 |
| 4,268,338 | 5/1981 | Peterson . |
| 4,490,598 | 12/1984 | Minney et al. . |
| 4,496,819 | 1/1985 | Acker et al. . |
| 4,529,859 | 7/1985 | Minney et al. . |
| 4,628,168 | 12/1986 | Nebergall et al. . |
| 4,857,129 | 8/1989 | Jensen et al. . |
| 4,950,347 | 8/1990 | Futagawa . |
| 4,954,678 | 9/1990 | Harmony et al. . |
| 5,093,546 | 3/1992 | Matsumiya et al. ............. 219/10.53 |

FOREIGN PATENT DOCUMENTS

| | | |
|---|---|---|
| 1018525 | 10/1952 | France . |
| 1167682 | 8/1958 | France . |
| 1158577 | 11/1959 | France . |
| 1515148 | 1/1968 | France . |
| 51-28236 | 10/1976 | Japan . |
| 939036 | 4/1958 | United Kingdom . |
| 797202 | 6/1958 | United Kingdom . |

OTHER PUBLICATIONS

Engineering & Research Associates, Inc., "Sebra Operating Instructions Sebra Model 2380 Hand Held Tube Sealing System," Mar. 28, 1991, pp. 1–20, Tucson, Ariz.

Primary Examiner—Philip H. Leung
Attorney, Agent, or Firm—Bruce R. Winsor

[57] ABSTRACT

An insulating sleeve retains heat in the plastic of a flexible plastic medical tube when the plastic of the medical tube is dielectrically heated by a radio frequency tubing sealer. The heat retained by the insulating sleeve permits additional melting of the plastic of the medical tube after a seal has been formed. The additional melting results in forming an easily tearable web between the segments of the medical tube in the same operation as the sealing operation. The medical tube is selectively sealed without forming the easily tearable web by using the radio frequency tubing sealer without the insulating sleeve.

34 Claims, 1 Drawing Sheet

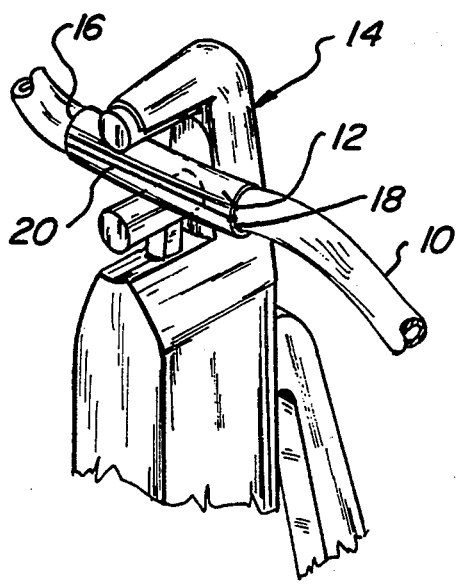
Fig_1
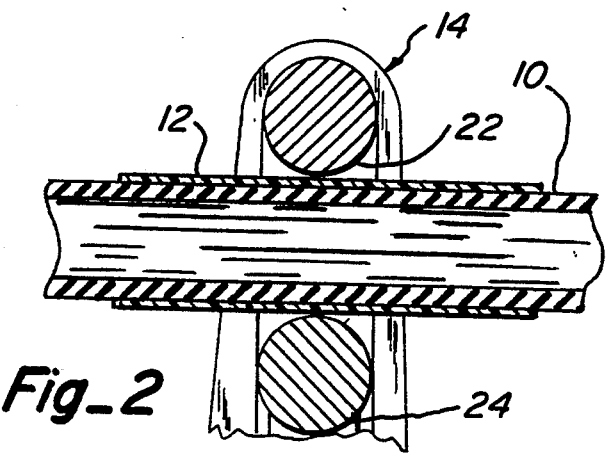
Fig_2
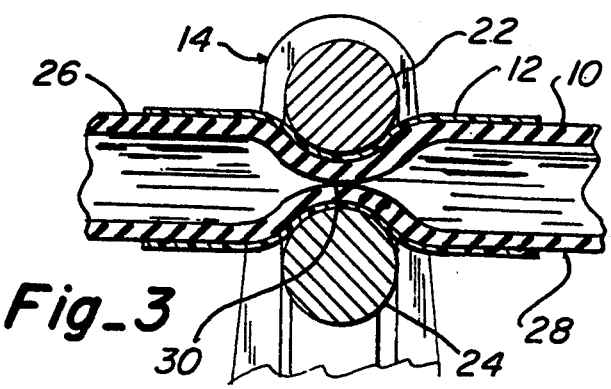
Fig_3
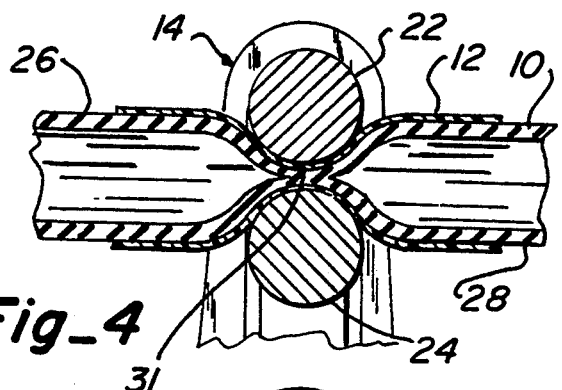
Fig_4
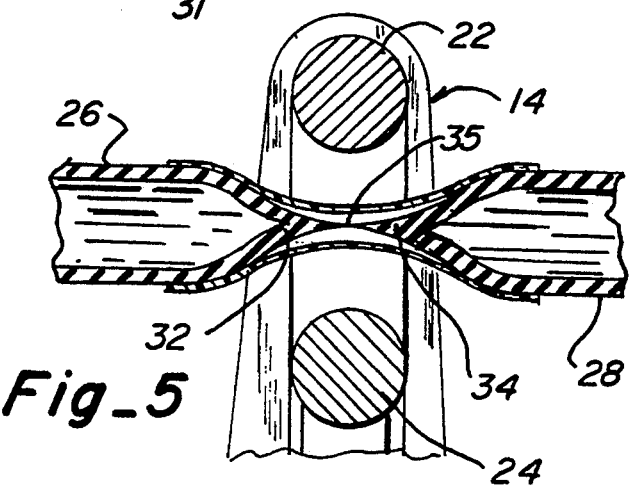
Fig_5
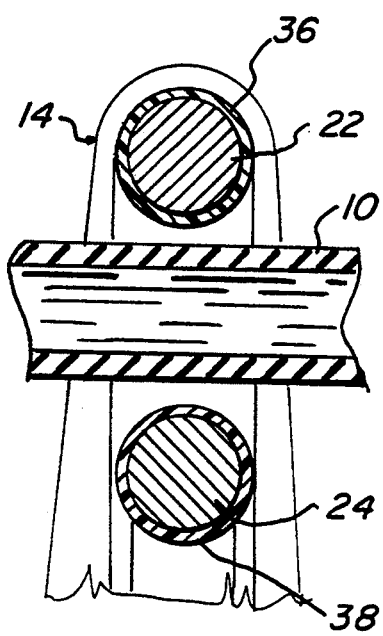
Fig_6

RADIO FREQUENCY TUBING SEALER

RELATED APPLICATIONS

This application is a continuation-in-part of U.S. patent application Ser. No. 07/952,951, filed Sep. 25, 1992, now abandoned.

FIELD OF THE INVENTION

This invention relates to the sealing of radio frequency excitable thermoplastic tubing.

THE BACKGROUND OF THE INVENTION

It is well known that various thermoplastic materials having high dielectric loss coefficients may be melted by the application of radio frequency (RF) electric fields which excite and dielectrically heat the thermoplastic materials. This principle has been successfully applied to sealing plastic tubing. For example, the principle has been used to seal flexible plastic tubing containing medical or biological fluids used with medical apparatus and in the collection of blood from blood donors.

U.S. Pat. No. 4,013,860, issued Mar. 22, 1977 to Hosterman et al. for a "Hand Held Electro-Mechanism Sealer" describes an example of a hand held tubing sealer. The Hosterman tubing sealer compresses a flexible plastic medical tube between two jaws. RF energy is applied to the jaws, creating an electrical field. The electrical field excites and dielectrically heats the plastic tube compressed between the jaws, partially melting the plastic material of the tubing. The partially melted material welds together to form a hermetic fluid-tight seal. The fluid-tight seal divides the tube into two segments and prevents fluid communication between the two segments. The segments are physically connected by a thick web of plastic.

The Hosterman sealer has been advantageously used to facilitate the collection, transfer, and processing of blood from blood donors, and has further been used with the collection of separated blood components using a medical apparatus such as the blood component separation equipment manufactured by a subsidiary of the assignee of the present invention.

It is recognized as desirable under some circumstances to seal a plastic medical tube and divide it into two non-communicating segments without physically separating the segments from each other. It is further recognized as desirable under other circumstances to seal the tube dividing it into two non-communicating segments and physically separate the segments from each other. Although tubing sealers such as the Hosterman tubing sealer have been successfully used to seal plastic medical tubing, they have not generally been adaptable to sealing the tubing in a manner that facilitates separating the segments from each other. In those circumstances where the tube is to be sealed and separated it is often necessary to manually tear the two segments of the tube from each other. The thick web of plastic left by the Hosterman device may be difficult to tear. Furthermore, it is possible to inadvertently tear a segment of the tube instead of the web, impairing the sterility of the fluid in the tube and potentially exposing the operator to contact with the fluid which may be infectious or otherwise hazardous.

Alternatively the two segments may be cut from each other using a knife or scissors. The use of the knife or scissors increases the time required. Furthermore, the knife or scissors must be used with great care to avoid cutting into the seal, thereby impairing the sterility of the fluid, and potentially exposing the operator to contact with the fluid. Furthermore, when a knife or scissors cuts into the seal the knife or scissors may become contaminated, making it hazardous to use the knife or scissors for any purpose until it is cleaned or sterilized.

Although tubing sealers such as the Hosterman tubing sealer are highly reliable and safe, occasionally a seal made in a tube will fail during a sealing operation, potentially exposing the operator to contact with the fluid in the tube.

It has been proposed to provide ridges or other protrusions on the jaws of a tubing sealer to emboss the thick web creating a thinner area. In practice it has been found that such embossing jaws do not reliably produce an easily tearable web between the segments of the tube.

A thermoplastic material welding device which incorporates an electrode covering material is illustrated in Great Britain patent specification 797,202 published Jun. 25, 1958 on an application by Rado entitled "Radio Frequency Heating Electrodes".

It is against this background that the significant improvements and advancements of the present invention in the field of sealing plastic tubing have evolved.

SUMMARY OF THE INVENTION

A contributing reason for the inability of the prior art RF tubing sealers to create a web thin enough for easy manual separation of the sealed segments of the tube from each other is that insufficient heat is retained in the thermoplastic of the tube to sufficiently melt through the tube. At least a portion of this heat is transmitted from the tube back to the jaws of the tubing sealer.

One aspect of the present invention is an insulating sleeve installed on the outside of a thermoplastic tube to permit sealing the tube while selectively leaving a thick or a thin web. In accordance with this aspect of the invention, an insulating sleeve is installed around the outside of the tube to be cut. The tubing sealer is then used to compress and heat the tube at the location of the insulating sleeve. The insulating sleeve causes the plastic in the tube to retain sufficient heat to both seal the tube, dividing it into two segments which are not in fluid communication and to create a thin, easily torn, web between the sealed segments. Further in accordance with this aspect of the invention, the tube may be sealed and a thick web created between the segments by using the tubing sealer at a location separate from the location of the insulating sleeve. Still further in accordance with this aspect of the invention, a plurality of the insulating sleeves may be coded to indicate a predetermined sequence or locations of sealing and separating a plurality of tubes, such as by use of color coding, alphabetical sequence coding or numerical sequence coding imprinted on the tubular insulating sleeves. Also in accordance with this aspect of the invention the insulating sleeve diverts fluid from contact with the face or other exposed part of an operator in the event of a failure of a seal.

Another significant aspect of the present invention is a tubing set for a medical device which has at least one insulating sleeve installed on a medical tube of the tubing set at a desired sealing location.

Still another significant aspect of the present invention is a selectively engageable insulator adapted for installation of the jaws of a tubing sealer. In accordance with this aspect of the invention, the tubing sealer may be selectively used for sealing the tube leaving a thick or a thin, easily tearable, web joining the sealed segments. The selectively engageable insulators are selectively engaged onto the jaws of the tubing sealer. When the tubing sealer is brought into contact with the tube and the tube is then simultaneously compressed by the jaws and dielectrically heated by an RF electric field applied by the jaws, heat is retained in the region being sealed and prevented from being transmitted from the thermoplastic of the tube to the jaws of the tubing sealer by the insulators engaged with jaws. The retained heat melts the tube, thereby sealing and dividing the tube into two segments and creating a thin, easily tearable web joining the segments of the tube to each other. Further in accordance with this aspect of the invention, the insulators may be selectively disengaged from the jaws of the tubing sealer to use the same tubing sealer to seal the tube and create a thick web joining the sealed segments to each other.

A more complete appreciation of the present invention can be obtained from understanding the accompanying drawings, which are summarized briefly below, the following detailed description of a presently preferred embodiment of the invention, and the appended claims.

BRIEF DESCRIPTION OF THE DRAWINGS

FIG. 1 is a perspective view of a tubing sealer being used with the insulating sleeve of the present invention to seal a fluid conveying tube.

FIGS. 2-5 are a series of sectional views illustrating the use of the insulating sleeve of the present invention with a tubing sealer to selectively seal a tube and create a thin easily tearable web in accordance with the present invention.

FIG. 6 is a sectional view illustrating an alternative embodiment of the insulating sleeves of the present invention.

DETAILED DESCRIPTION OF THE PREFERRED EMBODIMENT

FIG. 1 illustrates a medical tube 10 with a tubular insulating sleeve 12 of the present invention installed thereon. The medical tube 10 is a typical flexible thermoplastic medical tube of a type commonly used for conveying biological and medical fluids such as blood and its components, saline solution or anticoagulant. The thermoplastic material of the medical tube 10 has a relatively high dielectric loss coefficient so that it is excited and heated in the presence of a radio frequency (RF) electric field. Such tubes are commonly assembled into tubing sets (not shown) which comprise a plurality of individual lengths of medical tubes 10 assembled with other disposable components such as bags, reservoirs, sources of therapeutic fluids, oxygenators, dialyzers, pumps, etc., for use with a medical apparatus such as a blood component separation centrifuge, a dialysis apparatus or a heart/lung apparatus for use in open heart surgery. An RF tubing sealer 14 is used with the tubular insulating sleeve 12 of the present invention to seal the medical tube 10, and create a thin, easily tearable, web. The RF tubing sealer 14 may be of the type described in U.S. Pat. No. 4,013,860, issued Mar. 22, 1977 to Hosterman et al. for a "Hand Held Electro-Mechanism Sealer," and manufactured by Engineering and Research Associates, Inc., of Tucson, Ariz., as Sebra TM Model No. 2380.

The tubular insulating sleeve 12 of the present invention comprises a tube having a first end 16 and a second end 18 with an inside dimension or diameter sufficiently large that it will fit over the outside diameter of the medical tube 10. The sleeve 12 is a cylindrical tube having a circular cross sectional configuration in the presently preferred embodiment, but a tube having any cross sectional configuration, such as a square or hexagon, may also be used. It has been found that if the inside dimension of the tubular insulating sleeve 12 is sufficiently large to fit over the outside diameter of the fluid conveying tubing 10, the actual inside dimension is not critical. The tubular insulating sleeve 12 is formed of a material that has low dielectric loss coefficient so that it is not excited and heated in the presence of an RF electric field. The tubular insulating sleeve has an insulation value and wall thickness selected to retain sufficient heat in the thermoplastic material of the medical tube 10 so that when the medical tube is welded to form a seal dividing the medical tube into two segments, a thin, easily tearable, web is formed which facilitates physically separating the ends of the segments from each other while maintaining fluid tight seals on the ends of the two segments of the medical tube.

In the preferred embodiment the tubular insulating sleeve 12 is formed from a segment of polypropylene tubing having an inside diameter of 0.208 inches and a wall thickness of between 0.0055 inches and 0.0070 inches. Polypropylene tubular insulating sleeves 12 having wall thicknesses of 0.0050 and 0.0080 inches have also been successfully used. The polypropylene tubing used for forming the tubular insulating sleeves for the preferred embodiment was obtained from Sweetheart Cup Co. Inc., of Dallas, Tex. The tubular insulating sleeve 12 is preferably installed on the medical tube 10 during the manufacture of a tubing set (not shown) by slipping the tubular insulating sleeve over an end of the medical tube.

The tubular insulating sleeve 12 may optionally have a slit 20 extending through the wall of the tubular insulating sleeve and further extending from the first end 16 to the second end 18. The slit 20 may be longitudinally straight and parallel to an axis of the sleeve 12, or it may have a spiral configuration or a vee configuration. The slit 20 permits installing the tubular insulating sleeve 12 at a desired sealing location along the medical tube 10 by deforming the plastic material of the tubular insulating sleeve to spread the slit to a size at least as large as the outside diameter of the medical tube. This eliminates the necessity of sliding the tubular sleeve over an end of the medical tube 10 and permits installation of tubular insulating sleeves after a tubing set (not shown) is manufactured.

In an alternative preferred embodiment a plurality of tubular insulating sleeves 12 may have sealing sequence or location information formed on each sleeve, for example to instruct an operator of the tubing sealer 14 in a predetermined sequence of sealing a plurality of medical tubes 10 of a tubing set (not shown).

The operation of the tubing sealer 14 in conjunction with the tubular insulating sleeve 12 of the present invention is explained in conjunction with FIGS. 2 through 5. The medical tube 10 with the tubular insulating sleeve 12 installed thereon is placed between an upper jaw 22 and a lower jaw 24 of the tubing sealer 14. The jaws are moved towards each other by a mechanism (not shown) of the tubing sealer 14 until they come into contact with the surface of the tubular insulating sleeve 12. The jaws 22 and 24 are further moved towards each other, squeezing and flattening the medical tube 10 and the tubular insulating sleeve 12. The jaws 22 and 24 compress the tubular insulating sleeve 12 and medical tube 10 until the medical tube is squeezed tight, interrupting fluid communication between a first segment 26 and a second segment 28 of the fluid conveying tubing tube 10 at a sealing location 30 between the jaws. RF energy is applied to the upper jaw and lower jaw 22 and 24, respectively, to create an electric field between the upper jaw 22 and the lower jaw 24.

The electric field established by applying RF energy to the jaws 22 and 24 causes dielectric heating and resultant melting of the thermoplastic material of the medical tube 10. With the sides of the medical tube 10 contacting each other at the sealing location 30 the melting causes the sides to join and form a hermetic seal at the sealing location 30 permanently preventing fluid communication between the first and second segments 26 and 28, respectively. The first and the second segments 26 and 28 are physically joined by a thick web 31 of thermoplastic material.

In the absence of the tubular insulating sleeve 12, heat would be conducted from the plastic of the medical tube 10 to the jaws 22 and 24 of the tubing sealer 14 in an amount sufficient to prevent further melting of the thermoplastic material, and therefore to prevent forming a thin, easily tearable, web at the sealing location 30. With the tubular insulating sleeve 12 in place, however, sufficient heat is retained in the thermoplastic material of the medical tube 10 so that further melting occurs at the sealing location 30 as the jaws 22 and 24 are moved toward each other. This additional melting forms a thin, easily tearable, web 35 between the first segment 26 and the second segment 28, leaving a hermetic seal 32 and 34, respectively, on each end of a segment. The thin web 35 may then be manually torn to physically separate the first segment 26 from the second segment 28.

The medical tube 10 may selectively be sealed to interrupt fluid communication between the first segment 26 and the second segment 28 creating the thick web 31 instead of the thin web 35. To create the thick web 31 the radio frequency tubing sealer 14 is applied to seal the medical tube at a location on the fluid conveying tubing where there is no tubular insulating sleeve 12 installed.

Some RF tubing seal sealers 14 incorporate a timing circuit (not shown) or an impedance sensing circuit (not shown) to limit the amount of time that the electric field is applied to the thermoplastic material of the medical tube 10. For example, the Sebra TM model No. 2380 tubing sealer incorporates a timing circuit that limits the application of the RF electric field to approximately two seconds and which gives a visual indication when the time is completed. In practicing the present invention, it has been found that certain individual ones of the Sebra TM model No. 2380 tubing sealer, and other models of the tubing sealer manufactured by Sebra TM, require a longer time of application of the electric field when used with the present invention. It is, therefore, advantageous to modify the timing circuit (not shown) of certain models of tubing sealers 14 to apply the electric field to the thermoplastic material of the medical tubing 10 for four seconds when the tubing sealer is used with the present invention.

FIG. 6 illustrates an alternative preferred embodiment of the present invention. In this alternative preferred embodiment an upper insulator 36 is selectively engageable on the upper jaw 22 of the tubing sealer 14 and a lower insulator 36 is selectively engageable on the lower jaw 24 of the tubing sealer 14. With the selectively engageable insulators 36 and 38 engaged on the jaws 22 and 24 of the tubing sealer 14, using the tubing sealer 14 to seal the medical tube 10 will result in sealing the medical tube and creating the thin, easily tearable, web 35 between two segments 26 and 28. When the tubing sealer 14 is used with the selectively engageable insulators 36 and 38 disengaged from the jaws 22 and 24, the tubing sealer hermetically seals against fluid communication between the tubing segments 26 and 28 and creates the thick web 31 physically connecting the segments.

In one preferred embodiment the insulators 36 and 38 are polypropylene removable insulating sleeves having the same wall thickness as the tubular insulating sleeves 12 that are selectively engaged and disengaged by sliding the sleeves on to and off of the jaws 22 and 24.

Alternatively the insulators 36 and 38 could be permanently installed on the jaws 22 and 24 (not shown) and engaged and disengaged by rotating or sliding an insulating portion of the insulators into and out of an active position. Further the insulators 36 and 38 may permanently insulate only portions of the jaws 22 and 24 (not shown), so that they are engaged when insulated portions of the jaws are used to seal the medical tube 10 and disengaged when uninsulated portions of the jaws are used to seal the medical tube. Further still, a single insulator may be selectively engaged to insulate only one of the jaws 22 or 24, with the other jaw being uninsulated.

Although described by reference to medical tubing, it will be appreciated that the present invention may be used to seal thermoplastic tubing, selectively creating a thin or a thick web, in many fields of technology.

A presently preferred embodiment of the present invention has been described with some particularity. It should be understood that this description has been made by way of preferred example and that the invention is defined by the scope of the following claims.

What is claimed is:

1. In a radio frequency tubing sealer adapted to dividing and sealing of a fluid conveying tube by radio frequency dielectric heating and having two jaws for contacting and compressing the fluid conveying tube while applying the radio frequency dielectric heating to the tube during a sealing operation, an improvement comprising:

at least one selectively engageable insulator sleeve adapted to being engaged on a jaw of the tubing sealer in a relationship with the fluid conveying tube to be sealed intermediate the jaw and the fluid conveying tube and having a wall with a wall thickness which insulates the fluid conveying tube from the jaw to cause the tubing sealer to divide and seal the fluid conveying tube and create a thin, easily tearable, web when the selectively engageable insulator is engaged and to divide and seal the fluid conveying tube and create a thick web when the selectively engageable insulator sleeve is disengaged.

2. A radio frequency tubing sealer as defined in claim 1 wherein the improvement further comprises:

a selectively engageable insulator sleeve adapted to being engaged with each jaw of the tubing sealer.

3. A radio frequency tubing sealer as defined in claim 1 wherein:
the selectively engageable insulator is a removable insulating sleeve.

4. A radio frequency tubing sealer as defined in claim 1 wherein:
the jaws have a substantially cylindrical configuration with a predetermined diameter; and
the removable insulating sleeve has a substantially cylindrical tubular configuration having an inside diameter at least as large as the diameter of the jaw on which it is to be placed.

5. A radio frequency tubing sealer as defined in claim 4 wherein:
the tubular sleeve comprises a tubular sleeve of a plastic material.

6. A radio frequency tubing sealer as defined in claim 5 wherein:
the plastic material is polypropylene.

7. A radio frequency tubing sealer as defined in claim 6 wherein:
the wall thickness is greater than five thousandths of an inch.

8. A radio frequency tubing sealer as defined in claim 7 wherein:
the wall thickness is less than eight thousandths of an inch.

9. A radio frequency tubing sealer as defined in claim 6 wherein:
the wall thickness is less than eight thousandths of an inch.

10. A method of dividing and sealing a tube having a predetermined outside diameter and being formed of a material adapted to being heat sealed by an application of radio frequency dielectric heating and selectively creating a preselected one of a thick web or a thin, easily tearable, web at a sealing location, using a radio frequency tubing sealer having two jaws, the method comprising:
positioning the tube between the two jaws of the radio frequency tubing sealer;
selectively interposing at least one insulator between the tube and at least one of the jaws to selectively create the thin, easily tearable, web;
compressing the tube between the jaws of the tubing sealer;
applying radio frequency electrical energy to dielectrically heat the material of the tube.

11. A method of dividing and sealing a tube as defined in claim 10 wherein:
the step of applying radio frequency electrical energy has a time duration of more than two seconds.

12. A method of dividing and sealing a tube as defined in claim 11 wherein:
the step of applying radio frequency electrical energy has a time duration of approximately four seconds.

13. A method of dividing and sealing a tube as defined in claim 10 wherein the insulator comprises:
a sleeve having an inside dimension at least as large as the outer diameter of the tube and adapted to being installed on the tube at a sealing location in a substantially coaxial relationship with the tube, said sleeve having a wall with a wall thickness which insulates the tube and permits dividing and sealing the tube and forming a thin, easily tearable, web by the step of applying of the radio frequency dielectric heating.

14. A method of dividing and sealing a tube as defined in claim 13 wherein:
the sleeve comprises a cylindrical tubular sleeve.

15. A method of dividing and sealing a tube as defined in claim 13 wherein:
the sleeve is formed of a plastic material.

16. A method of dividing and sealing a tube as defined in claim 15 wherein:
the plastic material is polypropylene.

17. A method of dividing and sealing a tube as defined in claim 16 wherein:
the wall thickness is greater than five thousandths of an inch.

18. A method of dividing and sealing a tube as defined in claim 17 wherein:
the wall thickness is less than eight thousandths of an inch.

19. A method if dividing and sealing a tube as defined in claim 16 wherein:
the wall thickness is less than eight thousandths of an inch.

20. A method of dividing and sealing a tube as defined in claim 13 wherein a tubing set comprises at least one tube and a plurality of the sleeves, each sleeve having information thereon to indicate at least one of a predetermined location or a predetermined sequence of sealing the at least one tube, further comprising:
dividing and sealing the at least one tube at a plurality of predetermined sealing locations in a predetermined sequence.

21. A method of dividing and sealing a tube as defined in claim 20 wherein:
the information on the tubular sleeves is a color code.

22. A method of dividing and sealing a tube as defined in claim 20 wherein:
the information formed on the tubular sleeves is a numerical code.

23. A method of dividing and sealing a tube as defined in claim 20 wherein:
the information formed on the tubular sleeves is an alphabetical code.

24. A method of dividing and sealing a tube as defined in claim 13 wherein:
the sleeve further comprises a first end and a second end of the sleeve; and wherein:
the sleeve defines a slit through the wall of the sleeve, said slit extending from the first end to the second end of the sleeve and having two sides which are adapted to being spread apart by deforming the tubular sleeve to permit installing the sleeve on the fluid conveying tube.

25. A method of dividing and sealing a tube as defined in claim 24 wherein:
the slit is longitudinal and parallel to an axis of the tube.

26. A method of dividing and sealing a tube as defined in claim 10 wherein the insulator comprises:
at least one selectively engageable insulator sleeve adapted to being engaged on a jaw of the tubing sealer in a relationship with the tube to be sealed intermediate the jaw and the fluid conveying tube and having a wall with a wall thickness which insulates the tube from the jaw to cause the tubing sealer to divide and seal the fluid conveying tube and create a thin, easily tearable, web when the selectively engageable insulator is engaged and to divide and seal the tube and create a thick web when the selectively engageable insulator sleeve is disengaged.

27. A method of dividing and sealing a tube as defined in claim 26 wherein the insulator further comprises:
    a selectively engageable insulator sleeve adapted to being engaged with each jaw of the tubing sealer.

28. A method of dividing and sealing a tube as defined in claim 26 wherein:
    the selectively engageable insulator is a removable insulating sleeve.

29. A method of dividing and sealing a tube as defined in claim 26 wherein:
    the jaws have a substantially cylindrical configuration with a predetermined diameter; and
    the removable insulating sleeve has a substantially cylindrical tubular configuration having an inside diameter at least as large as the diameter of the jaw on which it is to be placed.

30. A method of dividing and sealing a tube as defined in claim 29 wherein:
    the tubular sleeve comprises a tubular sleeve of a plastic material.

31. A method of dividing and sealing a tube as defined in claim 30 wherein:
    the plastic material is polypropylene.

32. A method of dividing and sealing a tube as defined in claim 31 wherein:
    the wall thickness is greater than five thousandths of an inch.

33. A method of dividing and sealing a tube as defined in claim 32 wherein:
    the wall thickness is less than eight thousandths of an inch.

34. A method of dividing and sealing a tube as defined in claim 31 wherein:
    the wall thickness is less than eight thousandths of an inch.

* * * * *